July 21, 1964   E. L. EVANGELISTA   3,141,708
DEMOUNTABLE CLOSURE
Filed Aug. 28, 1961

INVENTOR
ERNEST L. EVANGELISTA
BY  *Edward H. Goodrich*
HIS ATTORNEY

United States Patent Office 3,141,708
Patented July 21, 1964

3,141,708
DEMOUNTABLE CLOSURE
Ernest L. Evangelista, Nutley, N.J., assignor to General Motors Corporation, Detroit, Mich., a corporation of Delaware
Filed Aug. 28, 1961, Ser. No. 134,806
2 Claims. (Cl. 308—36.1)

This invention relates to closures for positioning across the annular space between two relatively rotatable members and particularly to a demountable seal arrangement for closing the end of an annular lubricant chamber in a self-aligning bearing.

Precision antifriction bearings, such as roller bearings, have race rings and rolling elements ground within extremely close tolerances and these parts are assembled in closely interfitting running relation. Such bearings usually operate in the presence of suitable measured amounts of lubricant and it is very important that water, dirt and other deleterious materials should be prevented from entering the bearing. Hence, to maintain efficient operation and long bearing life, it is desirable to provide bearing end closures which maintain the lubricant within the bearing while excluding foreign material from entering into the bearing. Heretofore, seals for such bearings have often been unsatisfactory particularly under conditions of misalignment of race rings which may frequently occur in such a bearing. Furthermore, such seals have created an objectionable drag which has been detrimental to the operation of the bearing and which in some instances have even caused detrimental heating of the bearing. This problem of effectively sealing the ends of a bearing becomes even more difficult in a self-aligning bearing wherein the race rings of the bearing may angularly shift in their relationship to each other.

It is, therefore, an object of my invention to provide an improved closure for the end of an annular lubricant chamber in an antifriction bearing.

It is another object of this invention to provide an improved closure for the end of an annular lubricant chamber in an antifriction bearing which will maintain an effective sealing relation under conditions of misalignment in the bearing.

It is a still further object of this invention to provide an improved demountable seal of simple construction and which may be easily installed to effectively maintain a sealing relation at the end of a self-aligning antifriction bearing without detrimentally affecting the antifrictional characteristics of the bearing.

To these ends and also to improve generally upon devices of this character, this invention consists in the various matters and methods hereinafter described and claimed. In its broader aspects, the invention is not necessarily limited to the specific structures selected for illustrative purposes in the accompanying drawings wherein:

Figure 1:
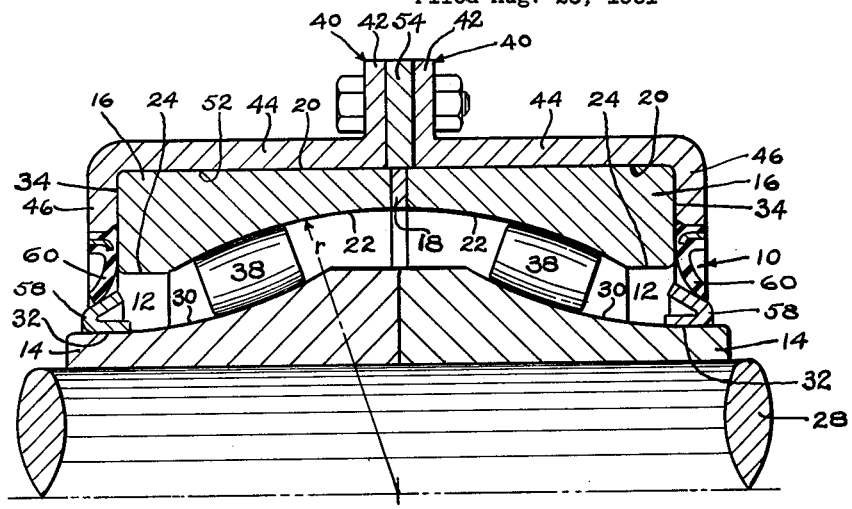
FIGURE 1 is a cross sectional view of a portion of an antifriction bearing closed at its ends with my improved seal.

My demountable closure is shown in the form of an annular seal 10 in closing relation across the end of an annular lubricant chamber 12 between relatively rotatable inner and outer race rings 14 and 16 of an antifriction bearing herein illustrated as a self-aligning double row roller bearing. The similar outer race rings 16 are in coaxial relation and preferably are in abutting relation at their inner ends with an intermediate spacing washer 18 having a cylindrical periphery coextensive with cylindrical outer surfaces 20 on the race rings 16. The inner diameter of the spacing washer 18 may correspond to that of the abutting inner race rings. Each outer race ring has a corresponding parti-spherical raceway 22, these raceways having a common radius $r$ struck from a central portion of the bearing. The outer end of each raceway 22 terminates in an annular land 24 which may be cylindrical. The corresponding inner race rings 14 are mounted upon a shaft 28 and have their enlarged flat inner ends in abutting relation centrally of the bearing. Each inner ring has a raceway 30 of substantially toric contour that diminishes in diameter towards the outer end of the ring and blends into a cylindrical surface 32 on the end of the ring. Each surface 32 preferably extends axially outwardly beyond a flat end face 34 of the radially adjacent outer race ring 16. The inner and outer race rings are maintained in relatively rotatable antifrictional relation through a cooperating series of circumferentially disposed rolling elements 38 herein shown as barrel-shaped rollers in mating rolling engagement with the adjacent opposed inner and outer raceways 30 and 22.

The outer race rings 16 are mounted in coaxial relation in a housing herein shown as having two corresponding housing members 40 formed from a suitable material as sheet metal. Each housing member 40 has an inner flat flanged portion 42 from which laterally projects a cylindrical hub 44 terminating at its outer end in a depending annular flange 46 provided with an axial bore 48 whose diameter preferably exceeds that of the annular land 24 at the outer end of the outer race ring 16. The cylindrical outer surface 20 of each outer race ring 16 demountably and closely fits within a cylindrical bore 52 in each hub 44 and the flat end face 34 of each ring 16 abuts against an inner flat wall of the annular flange 46. The corresponding opposing inner flanges 42, which may be of suitable configuration for mounting purposes, are separated by an annular spacer plate 54 and secured in aligned relation as by bolts. It will be appreciated that through proper choice of thickness of the washer 18 and the spacer plate 54, suitable rolling engagement may be maintained through the two sets of rollers 38 against the adjacent opposed raceways 22 and 30. This arrangement prevents end play between the race rings of the bearings and if desired may provide for a desired preloading of the rollers against the raceways to assure accurate radial relation of the race rings with respect to each other. The contour of the cooperating parti-spherical raceway 22, coupled with the barrel-shaped rollers 38, provides a self-aligning bearing wherein the inner and outer race rings may relatively tilt about the center of curvature of the raceways 22 which lies centrally of the bearing and within the axis of rotation of the shaft 28.

Figure 2:
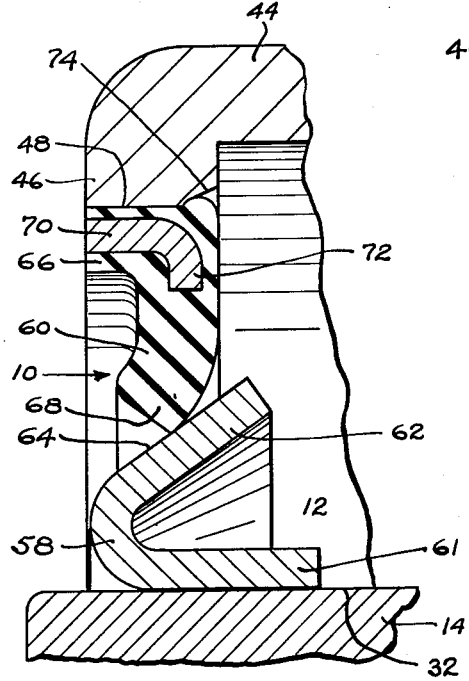
FIGURE 2 is an enlarged fragmentary cross section of my seal in operative position.
Figure 3:
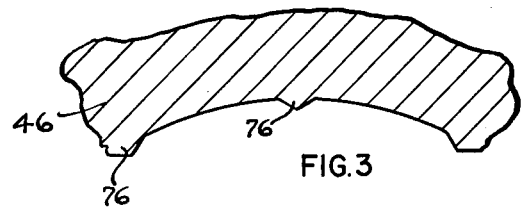
FIGURE 3 is a fragmentary sectional view showing a portion of the housing which receives the seal.
Figure 4:
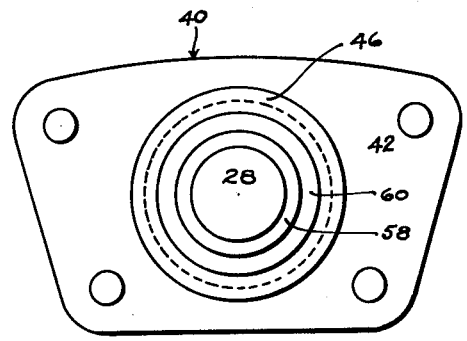
FIGURE 4 is an end view of the sealed bearing assembly.

My improved seal arrangement provides an effective closure which maintains lubricant within the chamber 12 and excludes foreign materials such as water and dirt from entering the bearing irrespective of the condition of misalignment of the race rings and even under conditions wherein there may be an appreciable relative tilt between the inner and outer race rings during bearing operation. This seal includes an annular slinger 58 and a flexible sealing washer 60 arranged for lightly deformable sealing engagement with the slinger. As best illustrated in FIGURE 2, the slinger 58 comprises an annular member which may be formed from suitable rigid material as sheet metal. This slinger has a cylindrical base portion 61 press-fitted over the cylindrical outer end surface 32 of the inner race ring 14 and the outer end of the slinger is folded inwardly towards the bearing to provide a sloping slinger portion 62 having a generally frusto-conical outer seal-wiping face 64. The slinger 58 is preferably aligned with the depending flange 46 of the adjacent housing 40 and the slinger portion 62 extends sufficiently into the end of the bearing to act as a rotating annular flange from which lubricant will be thrown back into the bearing during inner race ring rotation. If desired, the end surface of each inner ring 14 may be provided with a locating shoulder to aid positioning of the slinger member 58. It is preferable that the surface 64 be parti-spherical and have the same radius $r$ as that of the raceways 22. However, in the event that this radius is appreciable, the surface 64 may be frusto-conical and substantially tangential to a curved surface formed by this radius.

The sealing washer 60 has an axially projecting annular flange 66 from which radially inwardly extends an annular sealing lip 68 for lightly wiping sealing engagement against the surface 64 of the slinger 58. This sealing washer may be composed of various rubber-like materials which will not deteriorate or appreciably change resiliency in the presence of heat, light and bearing lubricants and which will resiliently deform even under conditions of bearing misalignment to maintain a positive lightly wiping sealing engagement against the surface 64. One satisfactory rubber-like material for my sealing washer comprises a resilient vulcanized synthetic rubber containing a polymerization product of butadiene and acrylic nitrile. The outer diameter of the annular flange 66 preferably slightly exceeds the diameter of the flange bore 48 to maintain a tightly fitting sealing relation. The sealing washer may be formed by a suitable molding operation during which time a reinforcing ring 70 is embedded within the laterally extending flanged portion 66. This reinforcing ring is preferably provided with a radially inwardly extending annular portion 72 to reinforce the radial body portion of the washer. During installation of the sealing washer, the deformably resilient rubber material between the reinforcing ring 70 and the surface of the bore 48 will compress to assure a tight non-leaking mounting of the seal within the flange 46 and against the outer flat end 34 of the outer race ring 16 as illustrated. I have preferably chamfered the inner end of the flange bore 48 at 74. This chamfer is interrupted by a series of circumferentially spaced inward flange projections 76. When the sealing washer is pressed into mounted position, the inner end of the sealing washer will deform as an annular bead extending into the chamfered portion 74 and will also deform about the projections 76 to firmly secure the washer in locked position and prevent it from rotating within the housing 40. Additionally, the inner side wall of each sealing washer locates in lateral seated sealing engagement with the end face of the outer race ring 16 as illustrated in FIGURE 1. When it is desired to remove the sealing washer 60, a light tool pried against the flanged portion 66 deforms the washer sufficiently to remove it from position without injury to the bearing or the sealing washer which may later be reinserted in sealing position.

I claim:
1. In a closure, a pair of relatively rotatable inner and outer bearing members having an annular lubricant chamber therebetween, a sleeve portion on the inner member axially projecting beyond the outer member, a housing receiving said outer member and having an annular end flange overlying and engaging an end of said outer member, said flange having an annularly extending recess, an annular slinger fitted over the sleeve portion within and radially spaced from the flange, a frusto-conical wall on said slinger and having an end extending into the lubricant chamber, a resilient rubber-like sealing washer peripherally and demountably seated in the flange against the end of the outer bearing member, said periphery being deformably received within the annularly extending recess in said flange, and an annular washer lip in sealing seated wiping engagement with said frusto-conical wall in spaced relation to said end of the slinger wall.

2. In a closure, a pair of inner and outer annular bearing members having a common center, said members being relatively rotatable and universally tiltable about said common center, said members having an annular lubricant chamber therebetween, a housing receiving the outer bearing member and having an annular end flange abutting an end of said outer member, a sleeve portion on the inner member extending through and radially spaced from the flange, a slinger mounted on the sleeve portion, said outer bearing member having a parti-spherical internal raceway concentric with said common center, a tapering wall on said slinger and having a parti-spherical outer face concentric with said common center and having the same radius as said raceway, said slinger wall having an inner end within the lubricant chamber, radially inwardly extending projections on the flange, said flange having an annular recess adjacent the end of the outer bearing member, a resiliently deformable sealing washer peripherally seated in the flange against the outer bearing member and deformably interfitting within said recess against the outer bearing member and against said inward projections, and an annular resilient sealing washer lip in yieldable wiping engagement with said parti-spherical outer face in spaced relation to the inner end of said slinger wall.

References Cited in the file of this patent

UNITED STATES PATENTS

| 1,835,127 | Willi | Dec. 8, 1931 |
| 2,600,434 | Saywell | June 17, 1952 |
| 2,619,369 | Williams | Nov. 25, 1952 |
| 2,678,246 | Potter | May 11, 1954 |
| 2,755,113 | Baumheckel | July 17, 1956 |
| 2,873,153 | Haynie | Feb. 10, 1959 |

FOREIGN PATENTS

| 47,555 | Sweden | Oct. 5, 1918 |
| 675,386 | Germany | May 8, 1939 |
| 153,472 | Australia | June 19, 1952 |